F. T. O'HANLON.
SELF FILLING FOUNTAIN OR RESERVOIR PEN.
APPLICATION FILED MAR. 20, 1922.
1,433,222.
Patented Oct. 24, 1922.
4 SHEETS—SHEET 1.
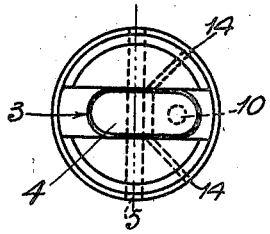
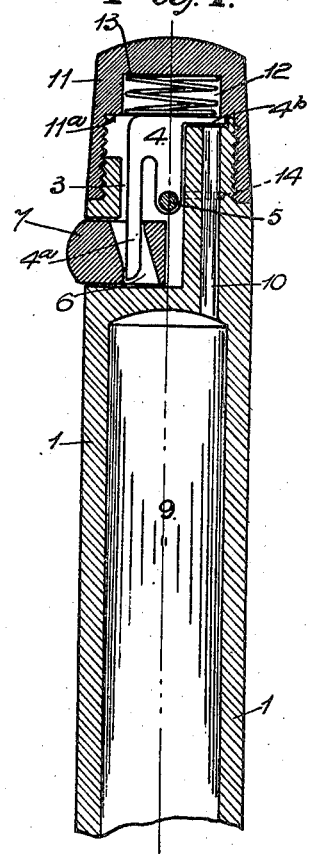
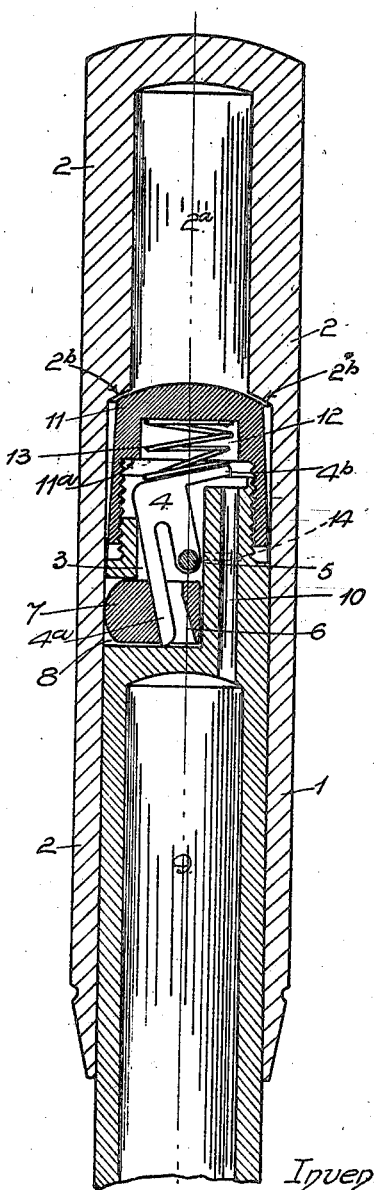
Inventor
Felix Thomas O'Hanlon
by
Att'ys

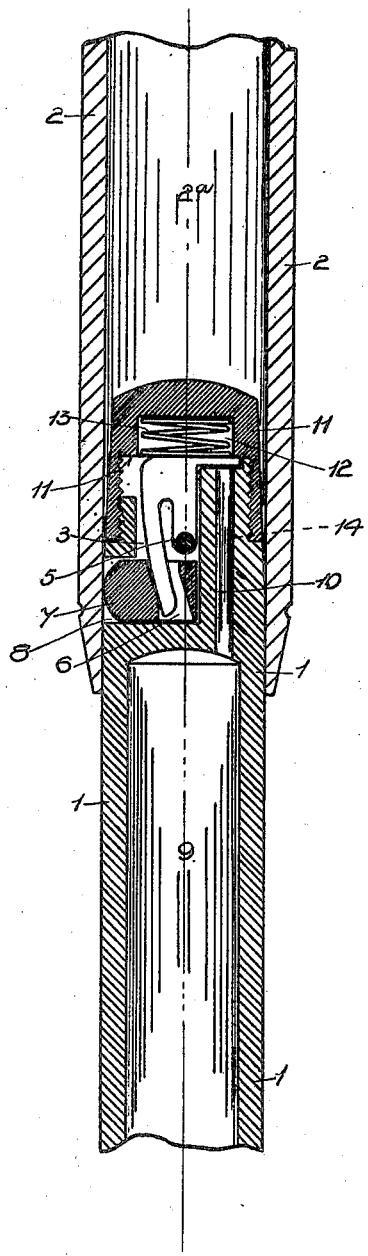

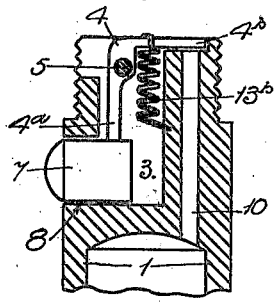
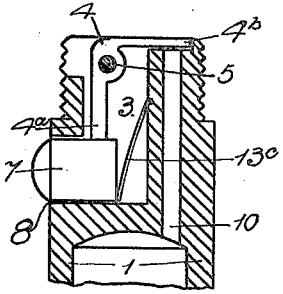
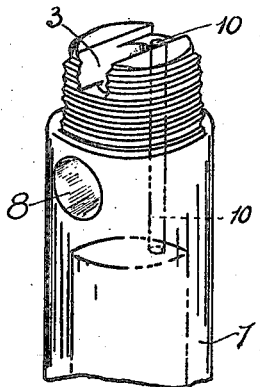
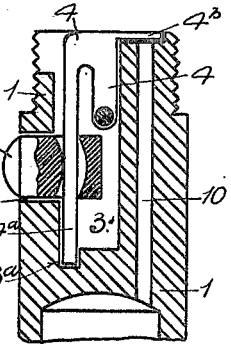
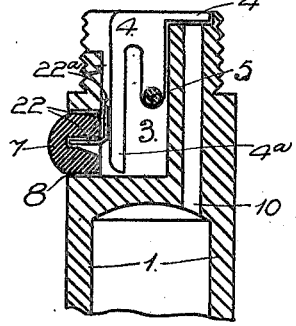
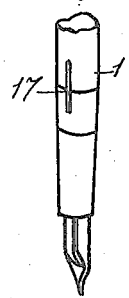

F. T. O'HANLON.
SELF FILLING FOUNTAIN OR RESERVOIR PEN.
APPLICATION FILED MAR. 20, 1922.

1,433,222.

Patented Oct. 24, 1922.

Inventor
Felix Thomas O'Hanlon,
by
Atty's

Patented Oct. 24, 1922.

1,433,222

UNITED STATES PATENT OFFICE.

FELIX THOMAS O'HANLON, OF LIVERPOOL, ENGLAND.

SELF-FILLING FOUNTAIN OR RESERVOIR PEN.

Application filed March 20, 1922. Serial No. 545,045.

*To all whom it may concern:*

Be it known that I, FELIX THOMAS O'HANLON, a subject of the King of England, residing in Liverpool, county of Lancaster, England, have invented certain new and useful Improvements in or Relating to Self-Filling Fountain or Reservoir Pens (for which I have filed an application in Great Britain, Number 3428, dated 28th January, 1921), of which the following is a specification.

This invention relates to self-filling fountain or reservoir pens of the type in which a charge of ink is induced into the pen body or barrel through the reciprocatory movement of an external cap or sleeve—preferably the cap which when the pen is not in use covers the nib—on the outside of the barrel; and has for its objects to provide a pen which shall be simple in construction, and of large ink holding capacity. The ink charging operation is effected through the mere withdrawal of the cap or sleeve, and it is ensured that all residue ink shall be discharged before induction takes place.

Broadly, my invention consists in the provision at the rear or shank end of the pen body or barrel of an air opening or openings and a valve which normally closes said opening or openings; means whereby said valve is opened and maintained open through the contact of the inside wall of the cap with a valve actuating part or member, which or a portion whereof normally protrudes, or is adapted to be protruded, into the travelling path of the inside face of the cap, when said cap is reciprocated on the barrel in the discharging (of residue ink if any) and charging operation, and closes automatically when the latter operation is completed; and means (such, for instance, as a cap screwed on to the rear or shank end of the pen and adapted to bear on said valve) for locking said valve and maintaining same locked at will.

I will further describe my invention with the aid of the accompanying sheets of explanatory drawings, which show, by way of examples only, several modes of embodying same.

In said drawings:—

Figs. 1 to 4, inclusive, illustrate a pen according to one construction, Fig. 1 being a longitudinal section and Fig. 2 a plan of the rear or shank end of the pen prior to the application of the sleeve or cap; Fig. 3 is a longitudinal section showing positions of the parts when the pen is in writing condition; and Fig. 4 is a longitudinal section showing the positions of the parts in the ink charging operation.

Fig. 5 is a perspective view of the rear or shank end of the pen, detachable parts being removed.

Figs. 6 to 9, inclusive, are longitudinal sections illustrating modified spring arrangements for effecting the valve closure.

Fig. 13 is a view of the nib end of the pen provided with an air admission slot.

Fig. 17 illustrates in section a modified mode of anchoring a valve actuating member.

In the several views like characters of reference denote like or equivalent parts wherever they occur.

Figure 15:
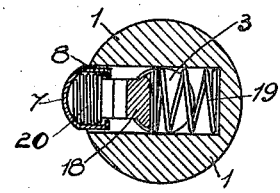
Figs. 14 and 15 are, respectively longitudinal and transverse sections of the rear or shank end of a pen provided with a modified valve arrangement.

Referring to the drawings, but first more particularly to the construction shown in Figs. 1 to 5:—

1 indicates the pen body or barrel and 2 is the sleeve cap which, when the pen is not in use, covers the nib in the usual manner. Within the rear or shank end of the pen body or barrel 1 there is formed a chamber or cavity 3 wherein is disposed a lever 4, $4^a$, $4^b$, which is pivotally mounted upon a pin 5 extending transversely across the body 1. Said lever 4, $4^a$, $4^b$ is constructed of vulcanite, hard fibre, or other suitable material, and the depending arm $4^a$ thereof enters a passage 6 provided in a "push" member 7 which passes through an aperture 8 formed in the pen body 1 and projects into the chamber or cavity 3.

Extending longitudinally from the ink space or reservoir 9 of the pen is a passage 10, the outer or upper end whereof is normally closed or sealed by an extension which constitutes a valve closure $4^b$ of lever 4, $4^a$, $4^b$.

Screwed on the outer end of the pen body or barrel 1 is a cap 11, $11^a$, having a recess 12 in which is housed a helically coiled wire spring 13.

Extending from the chamber or cavity 3 through the wall of the threaded portion of the pen shank are air passages 14.

Similar air communication may be effected in other convenient manner, and to facilitate such air communication by any or all methods, slots, or holes may be provided where necessary or desirable in lever 4, 4ª, 4ᵇ, and in the push member 7.

When the pen is not in use the parts are in the positions shown in Fig. 1, the sleeve cap 2 being fitted on the nib end of the pen and the cap 11 (hereinafter for the purpose of convenience of reference designated "valve cap") screwed down to positively maintain the valve closure 4ᵇ on its seating to seal the passage 10 through the abutment of the shoulder 11ª of said valve cap. It will be noted also that the outer portion of the push member 7 protrudes or projects beyond the wall of the body or barrel 1.

When it is desired to use the pen for writing purposes, the sleeve cap 2 is withdrawn from the nib end of the pen and placed on to the rear or shank end, (see Fig. 3) in which action it meets the portion of the push member 7 protruding into its travelling path, and displaces same inwardly, the arm 4ª of said lever 4, 4ª, 4ᵇ, possessing sufficient elasticity or "spring" to permit of such displacement, and the passage 6 being of such shape or configuration as to permit of the bending or flexing of the arm (see Figs. 3 and 4).

When it is desired to charge the pen with ink, sleeve cap 2 is withdrawn and push member 7 returns to its normal position, see Fig. 1 through the reaction of spring arm 4ª. Valve cap 11 is now unscrewed slightly (say about one-half of one turn) but valve closure 4ᵇ remains seated, under the influence of spring 13. Simultaneously said valve cap uncovers the outer ends of the passages 14 (each of which extends from the outside of the screwed shank to the chamber or cavity 3) and so establishes air communication between the atmosphere and the chamber or cavity 3.

The sleeve cap 2 is now slid on to the pen body or barrel, in which movement it cuts off the passages 14, 14, from the atmosphere, and displaces inwardly the push member 7, which latter, by bearing against the arm 4ª, of lever 4, 4ª, 4ᵇ, causes said lever to move about its pivotal support 5 so that the valve closure 4ᵇ rises from its seat against the resistance of said spring 13 and uncovers the upper or outer end of the passage 10, so establishing air communication between the ink reservoir 9 and the space 2ª within the sleeve cap 2, via passage 10, chamber or cavity 3, and passages 14.

In the continued inward or downward movement of said sleeve cap any residue ink remaining in the reservoir 9 will be discharged through superior air pressure in obvious manner.

The nib end of the pen is now immersed and sealed in ink and the sleeve cap 2 is retracted in which movement a charge of ink is induced into the reservoir 9 through the "vacuum" created therein.

It will be noted that an annular shoulder 2ᵇ is formed in the sleeve cap 2 which shoulder is adapted in the inward movement of cap 2 to contact with the top of the valve cap 11, and so control the stroke of said cap 2; the position of said shoulder is so timed or determined, as to ensure, on the return, or outward stroke of said cap that the ink induced into the reservoir 9 is the exact desired quantity or volume.

In the continued outer or retractive movement of the sleeve cap 2, it leaves said push member 7 with the result that said lever 4, 4ª, 4ᵇ is free to and does move about its pivotal support 5 under the influence of spring 13 so that the valve closure 4ᵇ automatically reseats itself to seal the passage 10.

Thus the ink charging operation is effected through the simple withdrawal or retraction of the sleeve cap 2.

Valve cap 11 is now screwed home to ensure the positive locking of valve closure 4ᵇ on its seat.

Figure 6:
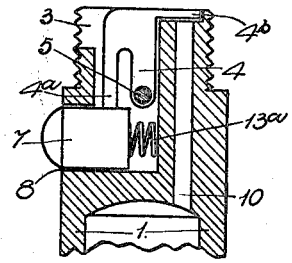

In the modification illustrated in Fig. 6, instead of the provision of spring 13 within a cavity 12 formed in the valve cap 11, a spring 13ª is disposed between the push member 7 and the opposing wall faces of the chamber or cavity 3.

In the modification illustrated in Fig. 7, spring 13ᵇ is of tension type, one end being secured to the valve closure 4ᵇ and the other end to the wall of the chamber or cavity 3. The construction of the lever, in this arrangement, is modified as shown, to provide for such a spring arrangement.

In the modification illustrated in Fig. 8, a plate spring 13ᶜ is employed, one end whereof is anchored to a wall of the chamber or cavity 3 and the other bears against the push member 7.

In the modified construction shown in Fig. 9, the lower end of the lever arm 4ª after passing through the push member 7 enters a socket 3ª formed in the chamber or cavity 3. This arm is of such "springiness" that the upper portion of the lever will turn about its pivotal support when said push member is displaced.

Figures 10, 11:
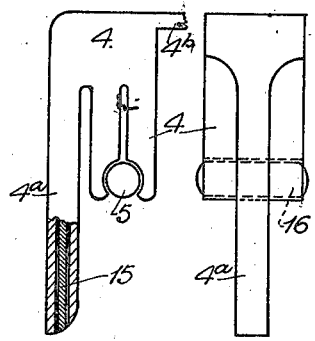
Figs. 10 and 11 are views showing modified modes of pivotally supporting a valve actuating member.

Referring to Fig. 10 the lever portion 4 is bifurcated, the component members whereof being hollowed or cut away, as shown, so that the lever may be detachably sprung on to the transverse pin 5 by insertion through the chamber or cavity 3 from the outer end.

In some cases, in order to enhance the flexibility of the arm $4^a$ a piece of spring steel wire 15, or the like, may be inserted as a core to add to the strength and/or elasticity.

In the modification illustrated in Fig. 11, instead of positioning the lever shown in Fig. 10 on a transverse pin carried through the pen body, a pin or spindle 16 is loosely fitted through the lower end of the portion 4, which is of appropriate width: the ends of which pin or spindle protrude somewhat so that on the positioning of the lever in a chamber or cavity 3 the spindle ends will engage in a friction tight manner against the walls thereof. Alternatively, holes may be bored transversely through the chamber or cavity 3 to provide anchorage for the spindle ends.

Figure 12:
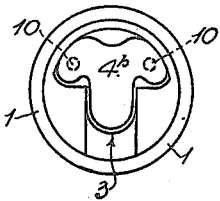
Fig. 12 is a plan view of the rear or shank end of a pen provided with modified air admission means.

Referring to the modification illustrated in Fig. 12, two air passages 10 are provided, the valve closure $4^b$ of lever 4, $4^a$, $4^b$, being appropriately enlarged to control same.

Referring to Fig. 13, 17 indicates a slot provided in the nib end of the body or barrel 1, which slot, when the pen is not in use, and the nib end is covered by the sleeve cap 2, effects air communication between the atmosphere and the interior of said cap.

Alternatively, this object may be attained by the formation of a flat or flats on the barrel, or in any other convenient manner.

Or a hole or holes may be provided in the sleeve cap 2 which are adapted to be closed by the finger or fingers of the user, or in other convenient manner, during the discharging and charging operation.

Figure 14:
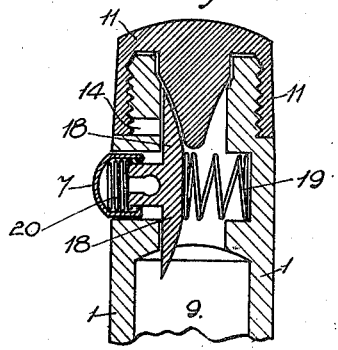
Figure 16:
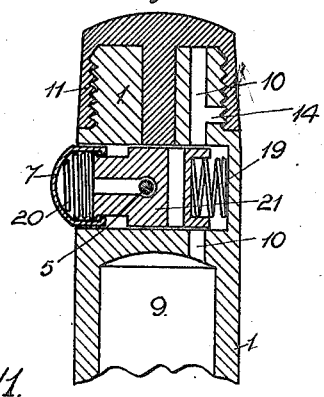
Fig. 16 shows a further modified valve.

Referring to Figs. 14 and 15, 16 represents a valve of mushroom type which is adapted to be operated by a push member 7 against a spring 19 located on the inside end of the valve and bearing against the wall of the pen body or barrel 1. A second spring 20 is fitted between the push member 7 and the valve 18 and is of greater strength than the spring 19 and so adapted as to overpush the latter in the operation of opening the valve 18. The depending extension $11^b$ of valve cap 11 when screwed home positively locks valve 18 by pushing laterally against it and on said valve cap being retracted the extension $11^b$ leaves space for the valve to open under the influence of the push member 7. When the valve is shut and locked the stronger spring 20 between push member 7 and the valve 18 will "give" sufficiently to permit of the cap 2 being pushed on the barrel 1 preparatory to the act of writing.

Referring to Fig. 16, 21 represents a slide valve. Normally this valve covers the air passage 10 and is maintained in locked position by the vertical pressure of extension $11^b$ of valve cap 11. Two springs 19 and 20 are fitted in similar manner to those in Figs. 14 and 15, and for the same purposes. Any suitable means may be used to prevent valve 21 from revolving.

In Fig. 17 there is shown a modified mode of anchoring the push member 7 in the aperture 8 bored in the barrel 1 for its reception. A wire spring 22 is so fitted that when the push member 7 is projected through the aperture 8 said spring 22 opens or expands and in so doing forms a projection $22^a$ which engages in the inside of the barrel as shown and prevents it from coming out of said aperture. Said push member 7 may be easily removed by pressing the spring 22 from the inside with any suitable instrument. Alternatively, the push member 7 may be anchored in any other convenient manner.

In Figs. 1, 3, 4, 14, and 16, of the drawings, the barrel 1 is shown slightly tapered at the valve or shank end so as to register or align with a corresponding taper shown on valve cap 11, to admit of the passage of air between the reservoir 9 of the barrel 1 and the space $2^a$ of cap 2 (via the passages already described) in the pen charging operation. This object may, however, be obtained in other convenient manner.

The valve cap shown in the drawings is an effective means of forming a positive valve lock, and at the same time serves the object of conserving the contour of the pen and of providing an effective means of keeping working parts clean by excluding dust, etcetera and fluff particularly from the pocket of the user. I may however, attain the said positive locking by any other means or by the use of any known mechanical device and may in so doing dispense with the cap should it from any cause be desirable to do so.

The spring or springs used may be of metal of any kind or of vulcanite or any suitable elastic material. If of metal they may, to prevent them being affected by the acids in the ink, be covered with any suitable acid resisting material, such as rubber or the like vulcanized after application, or may be similarly coated with elastic enamel or other acid resisting substance. Or, if metal, may be covered with another, and acid resisting metal, such as gold plate, or may be gold or silver plated by electrolytic deposition. Metal springs may be vulcanized into a piece of rubber. Rubber, cork, or any other elastic substance may be used instead of the springs shown on drawings.

Having now described my invention, what I claim as new and desire to secure by Letters Patent is:—

1. In a self-filling reservoir pen of the type in which a charge of ink is induced into the pen barrel through the reciprocatory movement of an external cap, an air opening or openings, provided at the rear end of the pen barrel; a valve which normally closes said opening or openings; means whereby said valve is opened and maintained open through the contact of the inside wall of the cap with a valve actuating member, which or a portion whereof normally protrudes or is adapted to be protruded into the travelling path of the inside face of the cap, when said cap is reciprocated on the barrel in the discharging (of residue ink, if any) and charging operation, and closes automatically when the latter operation is completed; and means for locking said valve and maintaining same locked at will.

2. In a self-filling reservoir pen of the type in which a charge of ink is induced into the pen barrel through the reciprocatory movement of an external cap, an air opening or openings provided at the rear end of the pen barrel; a valve which normally closes said opening or openings; means whereby said valve is opened and maintained open through the contact of the inside wall of the cap with a valve actuating member, which or a portion whereof normally protrudes, or is adapted to be protruded, in to the travelling path of the inside face of the cap, when said cap is reciprocated on the barrel in the discharging (of residue ink, if any) and charging operation, and closes automatically when the latter operation is completed; and a cap screwed on to the back end of the pen and adapted to bear on said valve for locking said valve and maintaining same locked at will.

In testimony whereof I affix my signature in the presence of two witnesses.

FELIX THOMAS O'HANLON.

Witnesses:
EMILY BURNETT,
I. F. V. HINDLEY WALKER.